(12) United States Patent
Rosenmeyer et al.

(10) Patent No.: US 11,358,426 B2
(45) Date of Patent: Jun. 14, 2022

(54) X-SPRING DEVICE FOR A MOTOR VEHICLE WHEEL SUSPENSION

(71) Applicant: VOLKSWAGEN AKTIENGESELLSCHAFT, Wolfsburg (DE)

(72) Inventors: Vicky Rosenmeyer, Braunschweig (DE); Sierk Fiebig, Braunschweig (DE); Michael Schiewek, Lachendorf (DE); Florian Glaubitz, Wendeburg (DE); Stefan Wolf, Braunschweig (DE); Ronald Bartz, Braunschweig (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 17/341,853

(22) Filed: Jun. 8, 2021

(65) Prior Publication Data

US 2021/0379948 A1 Dec. 9, 2021

(30) Foreign Application Priority Data

Jun. 8, 2020 (DE) ...................... 10 2020 207 153.5

(51) Int. Cl.
*B60G 3/20* (2006.01)
*B60G 11/08* (2006.01)

(52) U.S. Cl.
CPC ........ *B60G 11/08* (2013.01); *B60G 2202/114* (2013.01); *B60G 2204/121* (2013.01); *B60G 2206/428* (2013.01)

(58) Field of Classification Search
CPC .............. B60G 11/08; B60G 2202/114; B60G 2204/121; B60G 2206/428

USPC ..... 280/124.163, 124.171, 124.172, 127.173
See application file for complete search history.

(56) References Cited

U.S. PATENT DOCUMENTS

| | | | | |
|---|---|---|---|---|
| 5,251,930 A * | 10/1993 | Kusaka | ................. | B60G 11/08 267/260 |
| 5,826,896 A * | 10/1998 | Baumann | ............... | B60G 11/08 280/124.171 |
| 8,360,452 B2 * | 1/2013 | Kettenberger | ........... | B60G 7/02 280/124.175 |
| 8,376,326 B2 * | 2/2013 | Basin | ..................... | B60G 11/02 267/37.1 |
| 9,061,563 B2 * | 6/2015 | Girelli Consolaro | .. | B60G 11/10 |

(Continued)

FOREIGN PATENT DOCUMENTS

| DE | 2451671 A1 | 5/1976 |
|---|---|---|
| DE | 102016220325 A1 | 4/2018 |

(Continued)

*Primary Examiner* — Toan C To
(74) *Attorney, Agent, or Firm* — Barnes & Thornburg, LLP

(57) ABSTRACT

An X-shaped spring device for a transportation vehicle wheel suspension having for each wheel side a first leaf spring and a second leaf spring made of fiber-reinforced plastics material and arranged one above the other. The first leaf spring is supported at the wheel side with one end and the second leaf spring is supported at the vehicle structure side with one end, and a first securing device on which the first leaf spring and the second leaf spring are joined and clamped, and which has a bearing for pivotable bearing at the vehicle structure side. The first securing devices of both wheel sides are connected to each other to provide a stabilizer action by using a spring.

18 Claims, 4 Drawing Sheets

(56) References Cited

U.S. PATENT DOCUMENTS

| | | | |
|---|---|---|---|
| 10,343,475 B2* | 7/2019 | Moeller | B60G 11/12 |
| 10,889,154 B2 | 1/2021 | Winter | |
| 2013/0241167 A1* | 9/2013 | Perri | B60G 11/10 |
| | | | 280/124.134 |
| 2014/0167339 A1* | 6/2014 | Wagner | B60G 11/08 |
| | | | 267/260 |
| 2016/0207370 A1* | 7/2016 | Moeller | B60G 11/12 |
| 2018/0297430 A1* | 10/2018 | Berlingieri | B60G 11/10 |
| 2019/0023093 A1* | 1/2019 | Gerhards | B60K 1/04 |
| 2019/0061455 A1* | 2/2019 | Buchwitz | B60G 9/00 |
| 2019/0143774 A1* | 5/2019 | Gerhards | B60G 7/001 |
| | | | 280/124.128 |
| 2019/0241036 A1* | 8/2019 | Winter | B60G 7/008 |
| 2021/0268856 A1* | 9/2021 | Winter | B60G 11/10 |

FOREIGN PATENT DOCUMENTS

| | | |
|---|---|---|
| DE | 102017220188 A1 | 5/2019 |
| DE | 102018202353 A1 | 8/2019 |
| DE | 102018215111 B3 | 1/2020 |
| EP | 2639087 A1 | 9/2013 |

* cited by examiner

X-SPRING DEVICE FOR A MOTOR VEHICLE WHEEL SUSPENSION

PRIORITY CLAIM

This patent application claims priority to German Patent Application No. 10 2020 207 153.5, filed 8 Jun. 2020, the disclosure of which is incorporated herein by reference in its entirety.

SUMMARY

Illustrative embodiments relate to an X-shaped spring device for a transportation vehicle wheel suspension, comprising for each wheel side a first leaf spring and a second leaf spring which are made of fiber-reinforced plastics material and which are arranged one above the other, wherein the first leaf spring can be supported at the wheel side with one end and the second leaf spring can be supported at the vehicle structure side with one end, and a first securing device on which the first leaf spring and the second leaf spring are joined and clamped, and which has a bearing for pivotable bearing at the vehicle structure side.

BRIEF DESCRIPTION OF THE DRAWINGS

The disclosed embodiments are explained in greater detail below with reference to the drawings. In the drawings.

DETAILED DESCRIPTION

Figure 1:
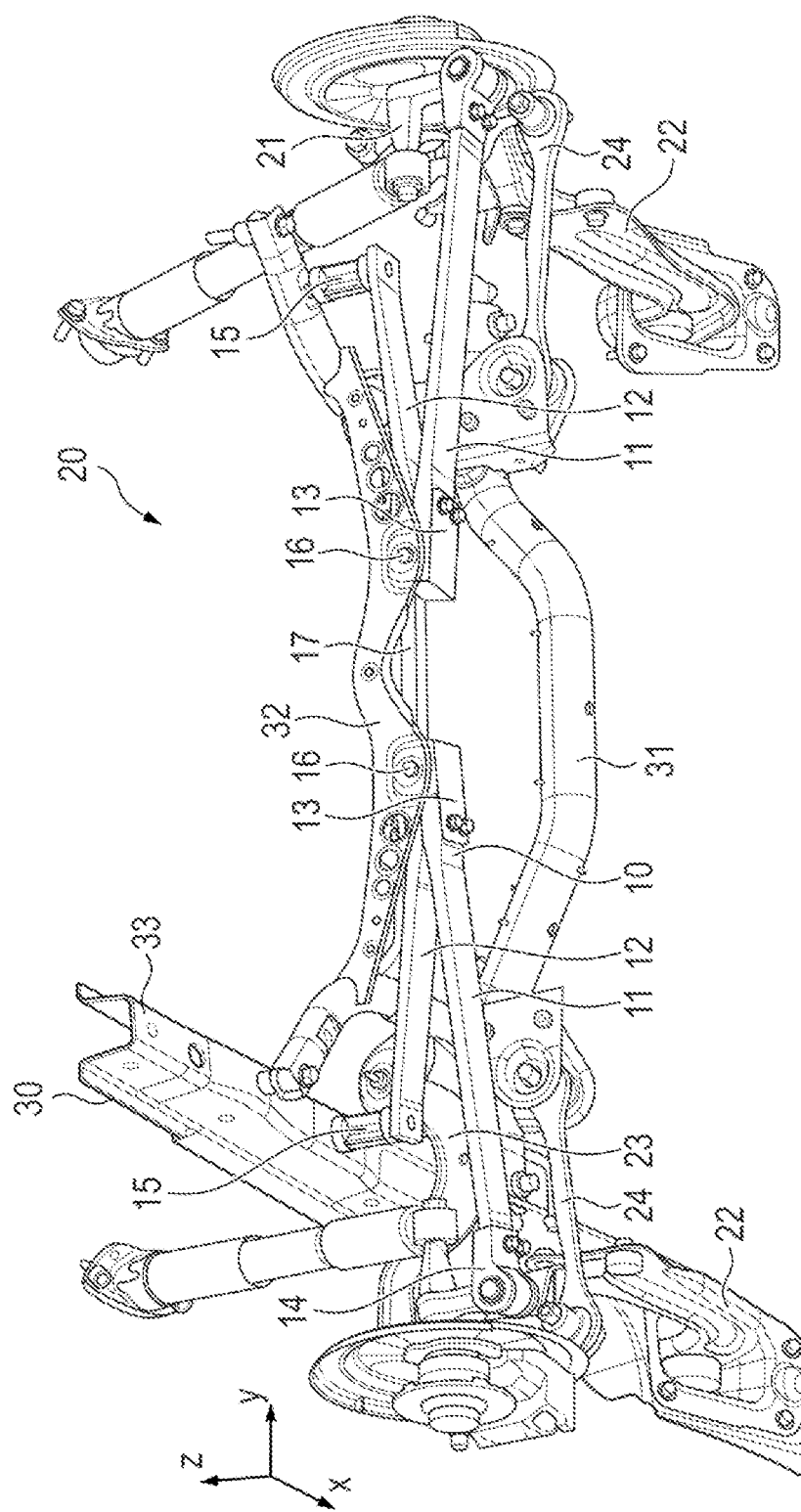
FIG. 1 is a spatial view of a first exemplary embodiment of a disclosed X-shaped spring device in an installation position on a transportation vehicle when the transportation vehicle is in an idle position on a horizontal surface.

Generic X-shaped spring device s of the type mentioned in the introduction are known from DE 10 2016 220 325 A1 and DE 10 2018 215 111 B3. In these publications, the first securing devices of both wheel sides are coupled to each other at the transportation vehicle center by a pivot joint whose pivot axis extends in the longitudinal vehicle direction. The effect of a stabilizer can thereby be achieved. A separate stabilizer can consequently be dispensed with.

Disclosed embodiments provide alternatives for providing such a stabilizer function.

This is achieved with an X-shaped spring device.

The disclosed X-shaped spring device is characterized in that the first securing devices of both wheel sides are now connected to each other by a spring instead of via a pivot joint.

The stabilizer effect on the X-shaped spring device can thereby be better adjusted.

Furthermore, the use of a spring instead of a pivot joint affords benefits in terms of structural space since it requires less space than a pivot joint and can be positioned in a more variable manner.

This may be particularly beneficial if the relevant structural space should be limited by an exhaust system and/or a spare wheel recess.

The spring may thus be constructed as a bending spring. The resilient action results in this instance primarily from a bending of the spring.

In a first construction option, the first leaf springs of both wheel sides, that is to say, the leaf springs which are connected in this instance with one end at the wheel side, are formed by part-portions of a continuous leaf spring, wherein the spring which connects the first securing devices of both wheel sides is formed by a central portion of this continuous leaf spring. In this instance, only one component is consequently required to perform the function of the first two leaf springs and the connection spring.

This continuous leaf spring may with respect to the installation position on a transportation vehicle extend below the bearings of the first securing devices of both wheel sides. The bearings of the first securing devices may accordingly be arranged in a raised position, which is beneficial for the ground clearance of the transportation vehicle.

In a first construction option, the second leaf springs of both wheel sides may be formed by part-portions of a continuous leaf spring, whilst the spring which connects the first securing devices of both wheel sides is formed by a central portion of this continuous leaf spring. In this instance, only one component is consequently also required to perform the function of the two leaf springs and the connection spring.

This continuous leaf spring may with respect to the installation position on a transportation vehicle be arranged so as to extend over the bearings of the first securing devices of both wheel sides. This is, for example, beneficial with respect to the passage of an exhaust system.

In a third construction option, the spring which connects the first securing devices of both wheel sides is an additional leaf spring, that is to say, in contrast to the two options mentioned above, an additional component which is clamped with a first end to the securing device of one of the two wheel sides and with an opposing second end to the securing device of the other of the two wheel sides. It is thereby readily possible with the first and second leaf springs being retained for each wheel side to achieve a differentiated adjustment of the stabilizer action since only the additional leaf spring needs to be modified for this purpose.

The additional leaf spring can be arranged in such a manner that a notional extension of the longitudinal axis of the additional leaf spring intersects with the bearings of the first securing devices of both wheel sides.

With regard to the adjustment of the stabilizer action, according to an exemplary embodiment the spring may have a tapered portion between the first securing devices of both wheel sides. This relates to both the continuous leaf springs in the central portion thereof and the additional leaf springs of the third construction option.

Furthermore, in this instance a transportation vehicle wheel suspension according to patent claim 10 is proposed. This wheel suspension comprises an X-spring device of the type explained above, wherein the first and second leaf springs each extend in the transverse vehicle direction or form therewith when viewed in a horizontal plane an angle of a maximum of +/−15°. When viewed in the longitudinal direction of the transportation vehicle, there is consequently an X-shaped spring system whose arms are formed by the leaf springs mentioned.

A particularly light and cost-effective axle for a transportation vehicle is thereby provided. The disclosed solution is particularly suitable for rear wheels of passenger transportation vehicles and light utility vehicles without being limited thereto.

In particular, the disclosed X-shaped spring device can be developed as described in DE 10 2016 220 325 A1 and DE 10 2018 215 111 B3, whose content in this regard is expressly incorporated in the present disclosure. This particularly applies to the spatial arrangement and the connection of the ends of the first and second leaf springs to the transportation vehicle structure and a wheel carrier.

Figure 2:
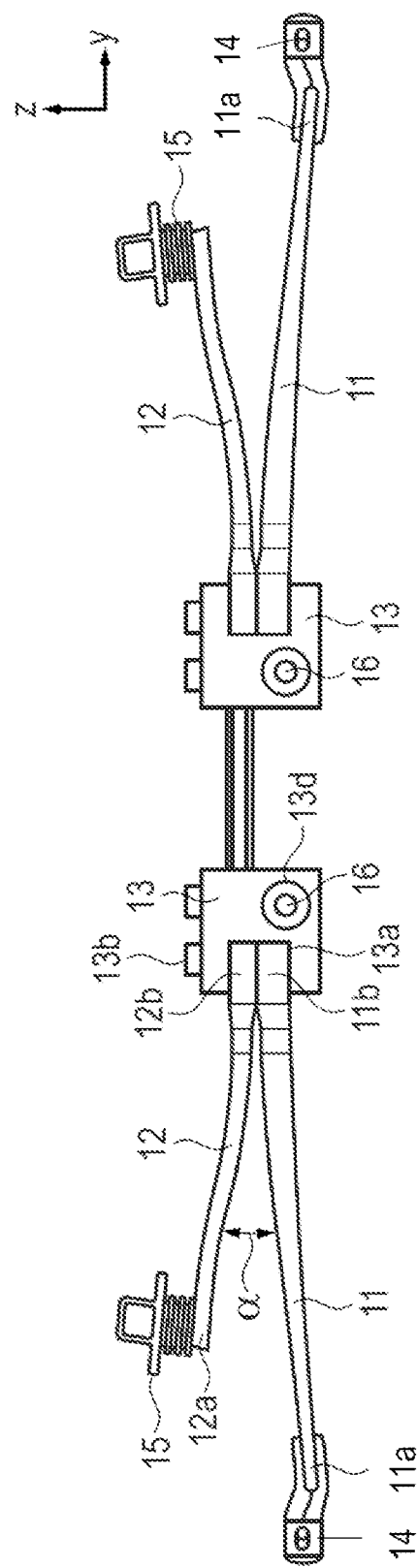
FIG. 2 is a side view of the X-shaped spring device of FIG. 1 when viewed in the forward travel direction.

The first disclosed embodiment, which is illustrated in FIGS. 1 and 2, shows an X-shaped spring device 10 for a transportation vehicle wheel suspension in the installation position on a transportation vehicle, in particular, a passenger transportation vehicle or light utility vehicle.

The X-shaped spring device 10 has for each wheel side a first leaf spring 11 and a second leaf spring 12. Both leaf springs 11 and 12 are produced from a fiber-reinforced plastics material, for example, glass-fiber-reinforced plastics material (GRP) or carbon-fiber-reinforced plastics material (CRP).

The first and second leaf springs 11 and 12 are arranged one above the other so that with respect to a vertical vehicle direction z the second leaf spring 12 extends over the first leaf spring 11.

In the exemplary embodiment illustrated, the first and second leaf springs 11 and 12 have different lengths. The first lower leaf spring 11 has a larger length than the second upper leaf spring 12.

Both leaf springs 11 and 12 at each wheel side are joined at a first securing device 13 for support at the transportation vehicle structure side.

In this instance, the main extent direction of the first leaf spring 11 and the main extent direction of the second leaf spring 12—in the relaxed state of the X-shaped spring device 10 according to FIGS. 1 and 2—form in a yz plane defined by the transverse vehicle direction y and vertical vehicle direction z an acute angle α. This acute angle α may be in a range from 15° to 35° so that, on the one hand, a small installation height can be ensured, but, on the other hand, a sufficient deflection potential for energy absorption is available.

Furthermore, the first leaf spring 11 has at a first end portion 11*a* a second securing device 14 for wheel-side support and the second leaf spring 12 has a third securing device 15 for structure-side support.

The second securing device 14 is used for wheel-side support, for example, on a wheel carrier 21 or a wheel guiding member.

Via the third securing device 15, a support from below on a longitudinal carrier 33 of a transportation vehicle structure 30 can be carried out.

As a result of the shorter length of the second leaf spring 12, the transportation vehicle-structure-side support location at the free end portion 12*a* in the transverse vehicle direction y is closer to the transportation vehicle center than the wheel-side support location of the first leaf spring 11.

The first securing device 13 for support at the transportation vehicle structure side is located in the region of the joined portions 11*b* and 12*b* of the first and second leaf springs 11 and 12. The X-shaped spring device 10 is pivotably supported in the region of the joined portions 11*b* and 12*b* directly on the transportation vehicle structure 30 or on a structure which is secured to the transportation vehicle structure, such as, for example, an auxiliary frame 31 or the like.

The first and second leaf springs 11 and 12 may be clamped directly with each other at their joined portions 11*b* and 12*b*.

In the exemplary embodiment illustrated in FIG. 1, the first securing device 13 has a clamp 13*a* for mutually clamping the joined portions 11*b* and 12*b* of the first and second leaf springs 11 and 12. By the clamp 13*a*, a rotational movement of the first leaf spring 11 which results from a deflection and a deformation thereof, can be transmitted to the second leaf spring 12 and vice versa.

The clamp 13*a* may, for example, be configured as a fork-like claw in which the joined portions 11*b* and 12*b* of the first and second leaf springs 11 and 12 are received. The configuration of the clamp 13*a* is, however, not limited to the shape of such a claw. Instead, other embodiments are also possible in this case. A clamping may be carried out by clamping bolts 13*b*. Via corresponding flange portions 13*c* of the claw, a uniform distribution of the clamping force over the surface of the joined portions 11*b* and 12*b* is achieved.

Furthermore, the first securing device 13 enables a pivotable bearing of the resilient device 10. The first securing device 13 has to this end a receiving member 13*d* for a bearing 16 for pivotable support on the transportation vehicle structure 30 or an auxiliary frame 31 which is provided on the transportation vehicle structure. In the exemplary embodiment illustrated, a bearing lug is, for example, integrated in the first securing device 13 for this purpose. However, for example, a bearing pin or the like, via which a pivotable bearing can be carried out, can also be used as a receiving member 13*d*. The pivot axis extends in this instance parallel with or at angles of up to +/−15° with respect to the longitudinal vehicle direction x.

According to the disclosed embodiments, the first securing devices 13 of both wheel sides are connected to each other by a spring 17 which in this instance may be constructed as a bending spring, in particular, a rod-like bending spring. This spring 17 is configured and arranged to increasingly counteract a mutual deflection of both wheel sides, that is to say, to act for the purposes of a return to the idle position shown in FIGS. 1 and 2. A separate stabilizer can thereby be dispensed with.

In comparison with a conventional pivot joint, the stabilizer action on the X-shaped spring device can be better adapted via such a spring 17. In addition, benefits are afforded with regard to structural space since a spring 17 requires less space and can be positioned in a more variable manner in comparison with a pivot joint.

In the first exemplary embodiment illustrated in FIGS. 1 and 2, the second leaf springs 12 of both wheel sides are formed by a single continuous leaf spring which at the same time also forms the spring 17 which connects the first securing devices 13 of both wheel sides. In this instance, these three springs 12 and 17 are integrated in a single component. The spring 17 is provided by a central portion of the continuous leaf spring, whilst the two second leaf springs 12 are outer part-portions thereof.

As can be seen in FIGS. 1 and 2, the continuous leaf spring (12, 17, 12) extends with respect to the installation position on a transportation vehicle over the bearings 16 of the first securing devices 13 of both wheel sides, whereby a larger spacing with respect to an exhaust tract is possible.

In a modification of the first exemplary embodiment, the spring 17 may also be constructed as a cylindrical helical spring.

FIG. 1 shows the installation of the X-shaped spring device 10 in a transportation vehicle wheel suspension 20.

The wheel suspension 20 comprises for each transportation vehicle wheel a wheel carrier 21 which is supported by several wheel guiding members, for example, transverse and longitudinal links 22, 23, 24, against the transportation vehicle structure 30 or a structure which is secured to the transportation vehicle structure, such as an auxiliary frame 31.

The present wheel suspension 20 is able to support the transportation vehicle mass without any helical spring. The function thereof is taken over in this instance by the X-shaped spring device 10. However, it is possible in a wheel suspension 20 which contains an X-shaped spring device 10 of the above-explained type to additionally use conventional helical springs to support the transportation vehicle mass.

The wheel suspension 20 illustrated is purely exemplary to explain the installation position of the X-shaped spring device 10 therein in greater detail. It must therefore be expressly emphasized that corresponding X-shaped spring device s 10 can also be used in wheel suspensions 20 other than those illustrated to support the mass of the transportation vehicle structure against the transportation vehicle wheels and where applicable to additionally perform wheel guiding functions.

The X-shaped spring device 10 explained above is installed in the wheel suspension 20 in such a manner that the first and second leaf springs 11 and 12 each extend in the transverse vehicle direction y or form an angle of a maximum of +/−15° with the transverse vehicle direction y when viewed in a horizontal plane xy.

The first leaf spring 11 is located in this instance with respect to the vertical vehicle direction z below the second leaf spring 12.

Furthermore, the X-shaped spring device 10 extends a very long way in the direction toward the transportation vehicle center, whereby for the first and second leaf springs 11 and 12 a significant length with correspondingly high energy absorption capacity is produced. As a result of the selected X-shape, the structural height in the vertical vehicle direction z remains small.

In the idle position of the transportation vehicle horizontally on a horizontal surface, the first leaf springs 11 extend primarily in a horizontal manner, that is to say, they form with the horizontal plane xy an angle of a maximum of +/−10°.

As shown in FIG. 1, the X-shaped spring device 10 may be connected in an articulated manner by the first securing devices 13 to a transverse strut 32 of the auxiliary frame 31.

To achieve the greatest possible length of the X-shaped spring device 10 in a transverse vehicle direction y, the first securing devices 13 are optionally arranged in a central third in the transverse vehicle direction y with respect to the track width of the transportation vehicle and, optionally, in a central fifth around the longitudinal center axis of the transportation vehicle. The connection to the auxiliary frame 31 is carried out, for example, by a bearing 16 which is configured as a rubber bearing 16 in the receiving member 13d of the first securing device 13 so that the leaf spring pairs of each wheel side can pivot in each case about a rotation axis which extends at an angle of up to +/−15° with respect to the longitudinal vehicle direction x.

The X-shaped spring device 10 may be pivotably connected to the wheel carrier 21 by an additional rubber bearing. This additional rubber bearing couples the outer end portion 11a of the first leaf spring 11 to the wheel carrier 21 in an articulated manner, wherein the associated pivot axis of the joint formed in this manner also extends primarily in the longitudinal vehicle direction x. However, it is also possible for the outer end portion 11a of the first leaf spring 11 to be received, for example, in a clamp on the wheel carrier 21, that is to say, to be secured in a non-articulated manner.

Finally the X-shaped spring device 10 is supported with the end portion 12a of the second leaf spring 12 on the transportation vehicle structure 30. The introduction of force at the structure side is thereby divided over two locations. Such a support of the second leaf spring 12 may, for example, as shown in FIG. 1, be carried out on a longitudinal carrier 33 of the transportation vehicle structure 30. The support, is in this instance, may be carried out from below.

The disclosed embodiments enable a flat transportation vehicle axle with a low boot space or cargo space angle and a high boot or cargo space width.

The weight benefit of the leaf springs 11 and 12 made of fiber-reinforced plastics material may be translated practically completely into a weight reduction of the transportation vehicle weight since, in the region of the structure-side connection of the X-shaped spring device s 10, no weight-increasing reinforcement measures which would impair the weight benefit of the X-shaped spring device s 10 with first and second leaf springs 11 and 12 made of fiber-reinforced plastics material are required.

Via the resilient connection of the two wheel-side leaf spring structures, the stabilizer action can be adapted in a very variable manner over a large range. This would not be possible with a conventional pivot joint.

Figure 3:
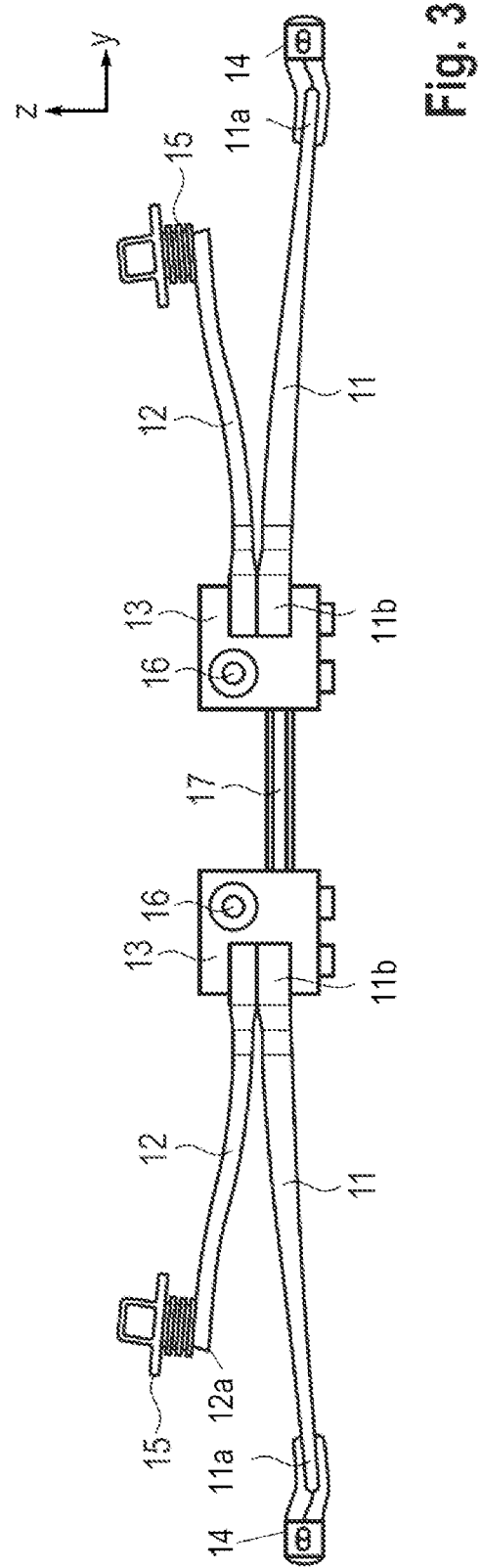
FIG. 3 is a view similar to FIG. 2 of a second exemplary embodiment of the X-shaped spring device.

FIG. 3 shows a second exemplary embodiment which differs from the first exemplary embodiment in that the first leaf springs 11 of both wheel sides and the connecting spring 17 are integrated in a continuous leaf spring in this instance, that is to say, they are constructed in an integral manner.

In other words, in the second exemplary embodiment the first leaf springs 11 of both wheel sides are formed by part-portions of the continuous leaf spring, whilst the spring 17 which connects the first securing devices 13 of both wheel sides is formed by a central portion of this continuous leaf spring.

The continuous leaf spring may extend through with respect to the installation position on a transportation vehicle below the bearings 16 of the first securing devices 13 of both wheel sides. More free space in an upward direction is thereby provided, which may be particularly beneficial with transportation vehicles without an exhaust train.

Otherwise, the second exemplary embodiment corresponds to the first exemplary embodiment.

Figure 4:
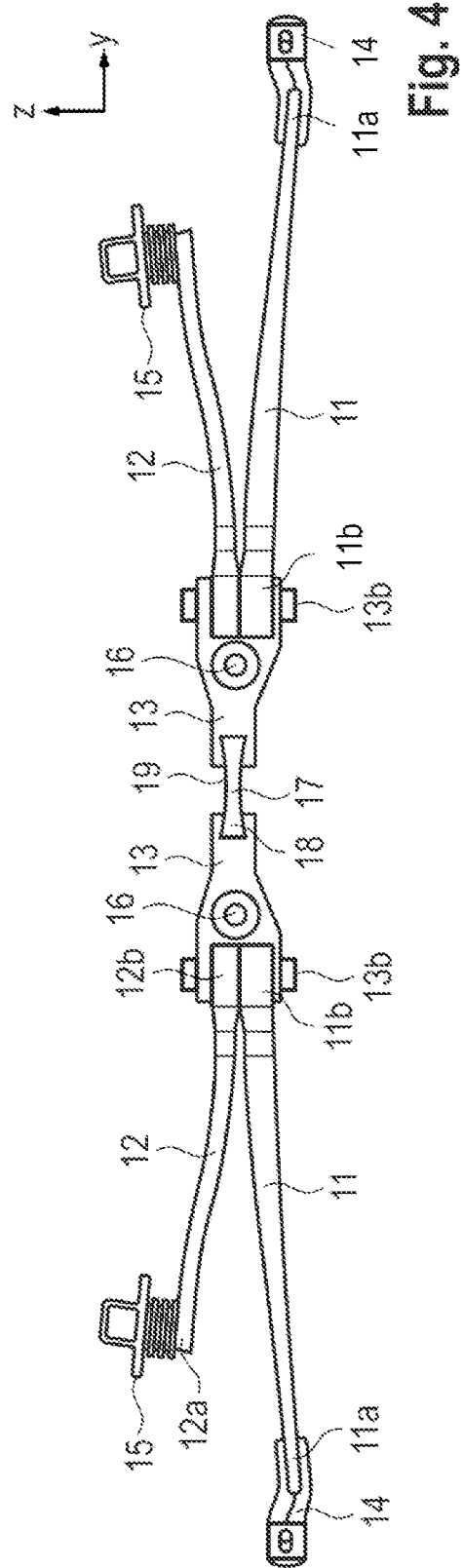
FIG. 4 is a view similar to FIG. 2 of a third exemplary embodiment of the X-shaped spring device.

FIG. 4 finally shows a third exemplary embodiment in which the connecting spring 17 is configured as a separate component. The adjustment of the stabilizer action of the X-shaped spring device can thus be carried out in a very simple manner via this spring without additional components having to be modified for this purpose.

In FIG. 4, this spring which connects the first securing devices 13 of both wheel sides is configured by way of example as an additional leaf spring 18 which is clamped with a first end to the securing device 13 of one of the two wheel sides and with an opposing second end to the securing device 13 of the other of the two wheel sides.

A notional extension of the longitudinal axis of the additional leaf spring 18 intersects with the bearings 16 of the first securing devices 13 of both wheel sides.

To adjust the stabilizer action, the spring 17 may optionally have a tapered portion 18 between the first securing devices 13 of both wheel sides, as indicated in FIG. 4. This relates both to the continuous leaf springs of the first two exemplary embodiments in the central portion thereof and to the additional leaf spring 18 of the third exemplary embodiment.

The disclosed embodiments have been explained in greater detail above with reference to disclosed embodiments and additional modifications. The exemplary embodiments and the modifications serve to demonstrate the implementation of the disclosed embodiments. Individual technical features which have been explained above in the context of other individual features can also be implemented independently thereof and in combination with additional individual features even if this is not expressly described as long as this is technically possible. The disclosed embodiments are, therefore, expressly not limited to the embodiment specifically described, but instead includes all the embodiments defined by the patent claims.

LIST OF REFERENCE NUMERALS

10 X-shaped spring device
11 First leaf spring
12 Second leaf spring
11*a* (External) end portion of the first leaf spring 11
11*b* Joined portion of the first leaf spring 11
12*b* (External) end portion of the second leaf spring 11
12*b* Joined portion of the second leaf spring 12
13 First securing device
13*a* Clamp
13*b* Clamping bolt
13*c* Flange portion
13*d* Bearing receiving member
14 Second securing device
15 Third securing device
16 Bearing
17 Spring
18 Additional leaf spring
19 Tapered portion
20 Transportation vehicle wheel suspension
21 Wheel carrier
22 Longitudinal link
23 Upper transverse link
24 Lower transverse link
30 Transportation vehicle structure
31 Auxiliary frame
32 Transverse strut
33 Longitudinal carrier
x Longitudinal vehicle direction
y Transverse vehicle direction
z Vertical vehicle direction
α Angle

The invention claimed is:

1. An X-shaped spring device for a transportation vehicle wheel suspension, the device comprising:
  a first leaf spring and a second leaf spring for each wheel side, each of the first and second leaf springs made of fiber-reinforced plastics material and arranged one above the other, wherein the first leaf spring is supported at the wheel side with one end and the second leaf spring is supported at the vehicle structure side with one end, and
  a first securing device for each wheel side on which the first leaf spring and the second leaf spring are joined and clamped, and which has a bearing for pivotable bearing at the vehicle structure side,
  wherein the first securing devices of both wheel sides are connected to each other by a spring arranged therebetween.

2. The X-shaped spring device for the transportation vehicle wheel suspension of claim 1, wherein the spring is a bending spring.

3. The X-shaped spring device for the transportation vehicle wheel suspension of claim 1, wherein the first leaf springs of both wheel sides are formed by part-portions of a continuous leaf spring and the spring which connects the first securing devices of both wheel sides is formed by a central portion of this continuous leaf spring.

4. The X-shaped spring device for the transportation vehicle wheel suspension of claim 3, wherein the continuous leaf spring extends with respect to the installation position on a transportation vehicle below the bearings of the first securing devices of both wheel sides.

5. The X-shaped spring device for the transportation vehicle wheel suspension of claim 1, wherein the second leaf springs of both wheel sides are formed by part-portions of a continuous leaf spring and the which connects the first securing devices of both wheel sides is formed by a central portion of this continuous leaf spring.

6. The X-shaped spring device for the transportation vehicle wheel suspension of claim 5, wherein the continuous leaf spring with respect to the installation position on a transportation vehicle extends over the bearings of the first securing devices of both wheel sides.

7. The X-shaped spring device for the transportation vehicle wheel suspension of claim 1, wherein the spring which connects the first securing devices of both wheel sides is an additional leaf spring which is clamped with a first end to the securing device of one of the two wheel sides and with an opposing second end to the securing device of the other of the two wheel sides.

8. The X-shaped spring device for the transportation vehicle wheel suspension of claim 7, wherein a notional extension of the longitudinal axis of the additional leaf spring intersects with the bearings of the first securing devices of both wheel sides.

9. The X-shaped spring device for the transportation vehicle wheel suspension of claim 1, wherein the spring has a tapered portion between the first securing devices of both wheel sides.

10. A transportation vehicle wheel suspension comprising the X-shaped spring device of claim 1, wherein the first leaf springs each extend in the transverse vehicle direction or form therewith when viewed in a vertical plane an angle of a maximum of +/−15°, and/or the first leaf springs in the idle position of the transportation vehicle extend horizontally on a horizontal face or form with a horizontal plane an angle of a maximum of +/−10°.

11. The transportation vehicle wheel suspension of claim 10, wherein the spring of the X-shaped spring device is a bending spring.

12. The transportation vehicle wheel suspension of claim 10, wherein the first leaf springs of both wheel sides are formed by part-portions of a continuous leaf spring and the spring which connects the first securing devices of both wheel sides is formed by a central portion of this continuous leaf spring.

13. The transportation vehicle wheel suspension of claim 12, wherein the continuous leaf spring extends with respect to the installation position on a transportation vehicle below the bearings of the first securing devices of both wheel sides.

14. The transportation vehicle wheel suspension of claim 10, wherein the second leaf springs of both wheel sides are formed by part-portions of a continuous leaf spring and the which connects the first securing devices of both wheel sides is formed by a central portion of this continuous leaf spring.

15. The transportation vehicle wheel suspension of claim 14, wherein the continuous leaf spring with respect to the installation position on a transportation vehicle extends over the bearings of the first securing devices of both wheel sides.

16. The transportation vehicle wheel suspension of claim 10, wherein the spring which connects the first securing devices of both wheel sides is an additional leaf spring which is clamped with a first end to the securing device of one of the two wheel sides and with an opposing second end to the securing device of the other of the two wheel sides.

17. The transportation vehicle wheel suspension of claim 16, wherein a notional extension of the longitudinal axis of the additional leaf spring intersects with the bearings of the first securing devices of both wheel sides.

18. The transportation vehicle wheel suspension of claim 10, wherein the spring has a tapered portion between the first securing devices of both wheel sides.

\* \* \* \* \*